(12) United States Patent
Stefanko

(10) Patent No.: US 9,497,951 B1
(45) Date of Patent: Nov. 22, 2016

(54) FISH HOOK AND BAIT CONTAINER

(76) Inventor: Daniel Stefanko, Matlacha, FL (US)

( * ) Notice: Subject to any disclaimer, the term of this patent is extended or adjusted under 35 U.S.C. 154(b) by 0 days.

(21) Appl. No.: 12/074,208

(22) Filed: Mar. 3, 2008

(51) Int. Cl.
*A01K 97/06* (2006.01)

(52) U.S. Cl.
CPC .................................. *A01K 97/06* (2013.01)

(58) Field of Classification Search
USPC .......................... 43/25.2, 57.1; 220/827, 830
See application file for complete search history.

(56) References Cited

U.S. PATENT DOCUMENTS

| | | | | |
|---|---|---|---|---|
| 228,598 A * | 6/1880 | Buckley | | 220/830 |
| 657,267 A * | 9/1900 | Epstein | | 220/830 |
| 731,335 A * | 6/1903 | Blanchet | | 43/25.2 |
| 744,462 A * | 11/1903 | Bishop | | 43/25.2 |
| 783,410 A * | 2/1905 | Bergoff | | 220/827 |
| 822,555 A * | 6/1906 | Rogers | | 220/827 |
| 912,263 A * | 2/1909 | Potter | | 220/827 |
| 1,032,326 A * | 7/1912 | Erichsen | | 220/830 |
| 1,165,894 A * | 12/1915 | Negraval | | 220/827 |
| 1,216,069 A * | 2/1917 | Cammack | | 43/25.2 |
| 1,269,743 A * | 6/1918 | Richmond | | 43/25.2 |
| 1,292,725 A * | 1/1919 | Dexter | | 220/830 |
| 1,364,594 A * | 1/1921 | Thomas | | 220/827 |
| 1,475,567 A * | 11/1923 | Dall | | 220/830 |
| 1,539,915 A * | 6/1925 | Shebat | | 43/57.1 |
| 1,611,494 A * | 12/1926 | Strauss | | 220/827 |
| 1,740,866 A * | 12/1929 | McBarron | | 220/827 |
| 1,918,664 A * | 7/1933 | Rasmusson | | 220/830 |
| 1,920,478 A * | 8/1933 | Norton | | 43/25.2 |
| 1,923,560 A * | 8/1933 | Whittaker | | 220/830 |
| 2,155,058 A * | 4/1939 | Osborn | | 220/830 |
| 2,156,740 A * | 5/1939 | Schweigert | | 43/57.1 |
| 2,175,673 A * | 10/1939 | Shields | | 220/830 |
| 2,231,909 A * | 2/1941 | Hempel | | 220/830 |
| 2,285,888 A * | 6/1942 | Benton | | 43/25.2 |
| 2,308,284 A * | 1/1943 | Ibach | | 220/830 |
| 2,344,507 A * | 3/1944 | Gookin | | 220/830 |
| 2,371,557 A * | 3/1945 | Sullivan | | 220/830 |
| 2,401,886 A * | 6/1946 | Shelton | | 43/57.1 |
| 2,464,880 A * | 3/1949 | McCombs | | 43/25 |
| 2,513,538 A * | 7/1950 | Williams | | 43/57.1 |
| 2,557,048 A * | 6/1951 | Haase | | 220/830 |
| 2,613,843 A * | 10/1952 | Suda | | 220/830 |
| 2,627,133 A * | 2/1953 | Pletcher | | 43/25.2 |
| 2,661,565 A * | 12/1953 | Jackson | | 43/57.1 |
| 2,674,826 A * | 4/1954 | Busse | | 43/57.1 |

(Continued)

FOREIGN PATENT DOCUMENTS

FR      2587880 A1 * 4/1987
JP      2000324997 A * 11/2000

(Continued)

*Primary Examiner* — Darren W Ark
(74) *Attorney, Agent, or Firm* — Werner H. Schroeder

(57) ABSTRACT

A container for a fish hook and a fish bait consisting of two halves. The two halves are hinged together on one side of the container. The container has two finger grip portions extending there from at the same side. The hinge is made of spring leaves that are connected together by a hinge pin. The hinge pin is surrounded by a coil spring. The ends of the coil spring abut against an underside of the finger grip portions and the spring is so biased that a pressure is exerted against the finger grip portions to thereby keep the two halves of the container in a closed position. It takes two fingers of one hand to open the container. The container has a hook on one end to be hooked to a fishing reel on a fishing rod. A line end of the fishing line is contained within the container and has a hook and a bait attached thereto.

3 Claims, 2 Drawing Sheets

(56) References Cited

U.S. PATENT DOCUMENTS

| | | | | |
|---|---|---|---|---|
| 2,691,840 A * | 10/1954 | Smith | | 43/25.2 |
| 2,699,623 A * | 1/1955 | Pragalz | | 43/25.2 |
| 2,702,960 A * | 3/1955 | Weaver | | 43/25.2 |
| 2,713,807 A * | 7/1955 | Herbert | | 43/57.1 |
| 2,715,292 A * | 8/1955 | Williams | | 43/25.2 |
| 2,723,746 A * | 11/1955 | Stevenson et al. | | 220/830 |
| 2,724,208 A * | 11/1955 | Nelson | | 43/57.1 |
| 2,767,502 A * | 10/1956 | Reynolds | | 43/25.2 |
| 2,809,766 A * | 10/1957 | Anderson | | 220/830 |
| 2,849,825 A * | 9/1958 | Reisner | | 43/25.2 |
| 2,861,711 A * | 11/1958 | Schneider | | 220/830 |
| 2,878,610 A * | 3/1959 | Herstedt | | 43/25.2 |
| 2,899,770 A * | 8/1959 | Bartlett | | 43/57.1 |
| 2,963,815 A * | 12/1960 | Carpenter | | 43/57.1 |
| 3,082,865 A * | 3/1963 | Nemsky | | 220/830 |
| 3,166,080 A * | 1/1965 | Neale | | 220/830 |
| 3,197,915 A * | 8/1965 | Staver | | 43/57.1 |
| 3,251,336 A * | 5/1966 | O'Brien | | 220/830 |
| 3,307,734 A * | 3/1967 | Campbell | | 220/827 |
| 3,481,066 A * | 12/1969 | Woolworth | | 43/57.1 |
| 3,490,169 A * | 1/1970 | Tweed | | 43/57.1 |
| D219,973 S * | 2/1971 | Sather | | 43/57.1 |
| 3,580,412 A * | 5/1971 | Weiss | | 220/830 |
| 3,639,021 A * | 2/1972 | Fee | | 43/57.1 |
| 3,645,419 A * | 2/1972 | Shorrock | | 43/57.1 |
| 3,739,518 A * | 6/1973 | Ziegler | | 43/57.1 |
| 3,858,345 A * | 1/1975 | Ziegler | | 43/57.1 |
| 3,930,594 A * | 1/1976 | Jungmann | | 220/830 |
| 4,015,361 A * | 4/1977 | O'Reilly et al. | | 43/25.2 |
| 4,198,777 A * | 4/1980 | Cruzan et al. | | 43/57.1 |
| 4,216,604 A * | 8/1980 | Starke | | 43/25.2 |
| 4,260,070 A * | 4/1981 | Pierson | | 220/827 |
| 4,441,274 A * | 4/1984 | Masur | | 43/25.2 |
| 4,452,003 A * | 6/1984 | Deutsch et al. | | 43/25.2 |
| 4,454,889 A * | 6/1984 | Contreras, Sr. | | 220/827 |
| 4,513,877 A * | 4/1985 | Taguchi et al. | | 220/830 |
| 4,757,637 A * | 7/1988 | Christensen | | 43/57.1 |
| 4,884,357 A * | 12/1989 | Clifford | | 43/25.2 |
| 4,920,683 A * | 5/1990 | Weber | | 43/25.2 |
| 4,936,040 A * | 6/1990 | Reiter et al. | | 43/25.2 |
| 5,056,256 A * | 10/1991 | Truax | | 43/25.2 |
| 5,123,199 A * | 6/1992 | Lysohir et al. | | 43/25.2 |
| 5,156,291 A * | 10/1992 | Mielke | | 220/830 |
| 5,233,783 A * | 8/1993 | Roebuck et al. | | 43/25.2 |
| 5,235,775 A * | 8/1993 | Daughtry | | 43/25.2 |
| 5,475,942 A * | 12/1995 | Tatum | | 43/25.2 |
| 5,502,916 A * | 4/1996 | Krewson, Jr. | | 43/25.2 |
| 5,505,014 A * | 4/1996 | Paullin | | 43/25.2 |
| 5,588,245 A * | 12/1996 | Vance | | 43/25.2 |
| 5,625,977 A * | 5/1997 | Medford | | 43/25.2 |
| 5,992,082 A * | 11/1999 | Barefoot | | 43/25.2 |
| 6,023,876 A * | 2/2000 | Haddad et al. | | 43/25.2 |
| 6,082,041 A * | 7/2000 | Croop et al. | | 43/57.1 |
| 6,085,455 A * | 7/2000 | Bracken et al. | | 43/25.2 |
| 6,129,237 A * | 10/2000 | Miyahara | | 220/830 |
| 6,301,825 B1 * | 10/2001 | Doreian | | 43/25.2 |
| 6,474,013 B2 * | 11/2002 | Terry | | 43/25.2 |
| 6,520,367 B1 * | 2/2003 | Piroch | | 220/830 |
| 6,588,624 B1 * | 7/2003 | Connors et al. | | 220/830 |
| 6,786,332 B1 * | 9/2004 | Patrick et al. | | 220/830 |
| 6,857,219 B2 * | 2/2005 | Jang | | 43/25.2 |
| 7,069,687 B2 * | 7/2006 | Jang | | 43/25.2 |
| 7,299,582 B1 * | 11/2007 | Whitehead | | 43/25.2 |
| 2002/0116861 A1* | 8/2002 | Stockdale | | 43/25.2 |
| 2004/0250462 A1* | 12/2004 | Trebil | | 43/25.2 |
| 2005/0091906 A1* | 5/2005 | D'Alusio | | 43/25.2 |
| 2005/0160657 A1* | 7/2005 | Dodge | | 43/25.2 |
| 2005/0178042 A1* | 8/2005 | Dodge | | 43/25.2 |
| 2007/0157505 A1* | 7/2007 | Dodge | | 43/25.2 |

FOREIGN PATENT DOCUMENTS

| | | | | |
|---|---|---|---|---|
| JP | 2001204337 A | * | 7/2001 | |
| JP | 2002125556 A | * | 5/2002 | |
| JP | 2002171885 A | * | 6/2002 | |
| JP | 2003061537 A | * | 3/2003 | |
| JP | 2004024222 A | * | 1/2004 | |
| WO | WO 8911791 A1 | * | 12/1989 | |

* cited by examiner

FISH HOOK AND BAIT CONTAINER

BACKGROUND OF THE INVENTION

The inventive concept is directed to the field of fishing equipment. It is particularly directed to both the commercial and sports fishermen to free them from the hazards and annoyance of snagging themselves, their clothing or their equipment with one or more of the hooks on a fish lure attached to the line of a fishing pole when transporting the fishing pole to different locations. There are a number of suggestions to solve the above noted problems.

U.S. Pat. No. 5,235,775 shows a fishing lure holder which employs a novel locking member on the opposite side of a hinge which is dividing two halves at that location. There are two snaps that engage around the fishing pole when not use. It takes at least two hands to snap open this lure holder.

U.S. Pat. No. 5,233,783 illustrates a container having the outer appearance of a fish. To gain access, with an opening that extends and includes the mouth end of the fish-like container.

U.S. Pat. No. 4,884,357 teaches a fish-hook combination container consisting of two halves that are hinged together. Each of the two halves has bulging surfaces that will accommodate the various items to be placed within the container.

U.S. Pat. No. 2,627,133 illustrates a fishing hook-bait combination that is partly settled within the confines of the fishing rod.

US published Application No. 2002/0116861 shows a hook/bait container that is clamped onto a fishing rod, has a hinge on one side of the container and a snap on the other side of the container. This is not a self-opening container.

US published Application No. 2005/0091906 illustrates a fishhook container having two halves that is hinged on one side and a snap-opening on the other side. This is not a self-opening type of container.

US published Application No. 2005/0160657 illustrates basically the same container as is shown in the container immediately above. The difference is that the container may take different forms, that is, either by exhibiting two hinged halves or by having a container having a removable cover thereon.

US published Application No. 2004/0250462 describes a hook/bait container where the fishing rod itself is enclosed within the container when it is closed as a protective device.

PCT No. WO 89/11791 illustrates a protection device for a fish hook consisting of two hinged halves that are held together by way of O-rings.

DETAILED DESCRIPTION OF THE INVENTION

Figure 1:
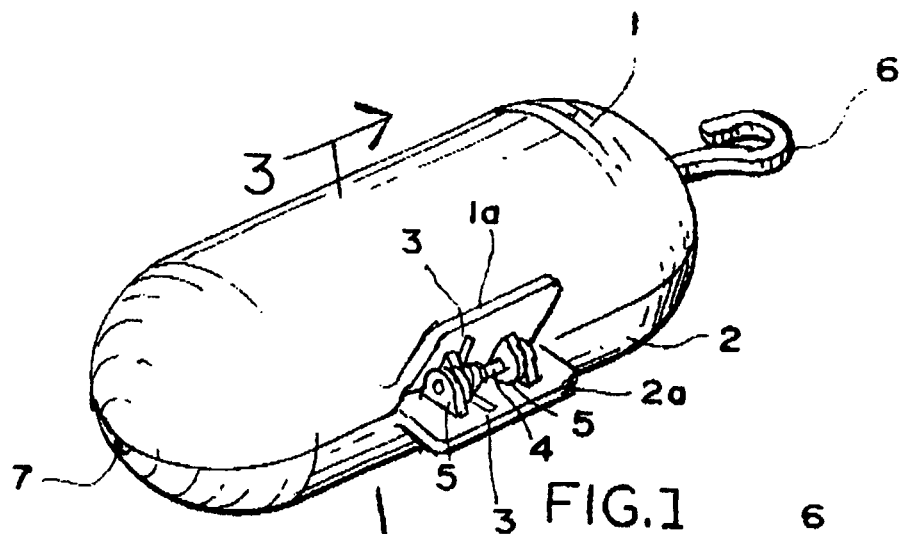
FIG. 1 shows the fish-hook bait container closed and in a perspective view.

FIG. 1 shows a perspective view of the fish-hook bait container in which the container consists of a first half 1 and a second half 2. The first half 2 has finger grip 1a thereon and the second half 2 has a finger grip 2a thereon. Both handgrips 1a and 2a are opposed to each other and when pushed together will open both halves in a two finger and one hand operation. The two halves 1 and 2 are connected to each other by way of hinge having interconnecting hinge leaves 5 which are spanned by a hinge pin 4. Also surrounding the hinge pin 4 there is a coil spring 3 which is so tensioned that the ends of the coil spring 3 abut against the underside of the finger grips 1a and 2a to thereby exert a biasing force against the finger grips so that the two halves 1 and 2 always tend to stay closed. This is important in the operation of the container because it only requires one hand and only two fingers thereof to open the container when needed. The coil spring 3 and hinge pin 4 each having a longitudinal axis which is generally parallel to a longitudinal axis of the container. One end of the container has a hook 6 thereon which is used to hook the container on an element of the fishing reel. The opposite end of the container has an opening 7 therein for the fishing line to pass through there when the hook and bait is contained in the container.

Figure 2:
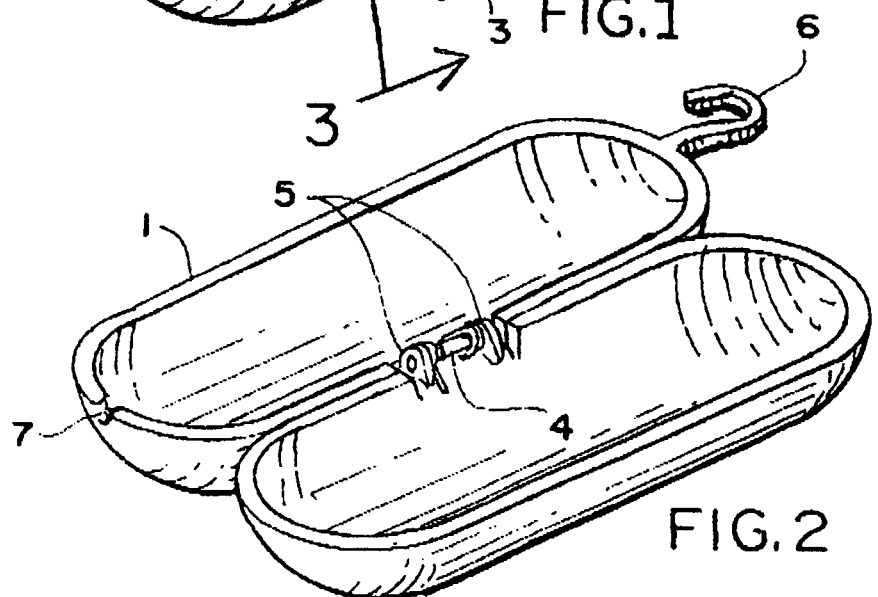
FIG. 2 shows the container of FIG. 1 in an open view.

FIG. 2 illustrates the container of FIG. 1 in an open position. The same reference characters have been applied as were in describing FIG. 1. The elements of the hinge can clearly be seen.

Figure 3:
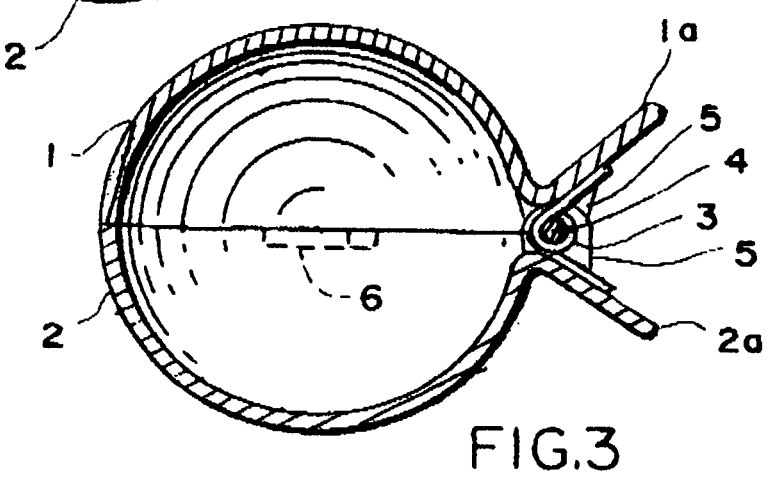
FIG. 3 illustrates the container of FIG. 1 in a cross section.

FIG. 3 is a cross section through the container. This cross section shows the upper half 1 and the lower half 2. The finger grips 1a and 2a can clearly be seen and when grasped by fingers on one hand, the two halves 1 and 2 will pivot around the hinge pin 4 against the bias of the spring 3. It should be noted that the cross section does not have to be round, as shown in FIG. 3, but also could be elliptical or any other forms.

Figure 4:
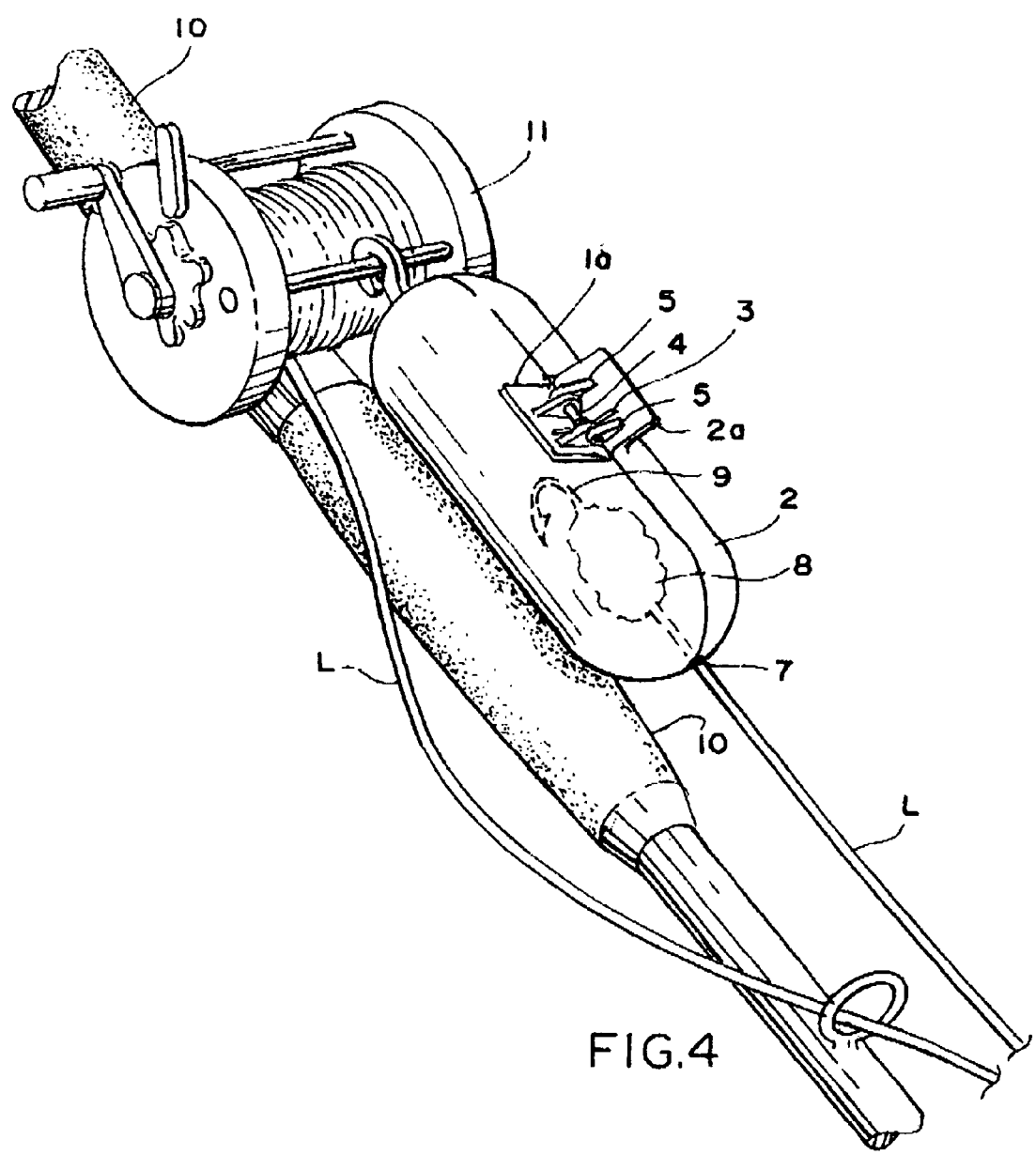
FIG. 4 shows the container of FIG. 1 placed on a fishing rod.

FIG. 4 shows the container attached to an element of the fishing reel 11. The fishing line L passes through the opening 7 into the interior of the container. Inside there is located a fishing hook 9 and bait 8 and is ready for use when the container is removed from the fishing rod 10.

What I claim is:

1. A container for miscellaneous items, said container having first and second ends which define a longitudinal axis therebetween, said container including a first half and a second half forming said container, each of said halves having at one longitudinal side thereof a finger grip portion extending outwardly there from in a direction generally transverse to said longitudinal axis of said container, said halves including a hinge having hinge leaves at said longitudinal sides thereof, said hinge leaves being connected together by way of a hinge pin, a coil spring surrounds said hinge pin, said coil spring and hinge pin having longitudinal axes extending generally parallel to said longitudinal axis of said container, said coil spring and hinge pin being located between said finger grip portions and said first and second halves, said coil spring having ends which each abut against an underside of one of said finger grip portions, said spring is biased against said finger grip portions to thereby tension said first and second halves to a closed position, whereby said container may be opened against the bias of said spring by two fingers of one hand moving said finger grip portions toward each other, said container has a hook at said first end thereof, and said container has an opening at said second end thereof for a fishing line to pass there through from an interior of said container.

2. The container of claim 1, wherein said hook and thereby the container is attached to a fishing reel on a fishing rod.

3. The container of claim 1 including a fish hook and a bait attached to said fishing line at an interior of said container.

* * * * *